United States Patent
Youdovin (10) Patent No.: US 11,359,952 B2
(45) Date of Patent: Jun. 14, 2022

(54) CONCENTRATED LAUNDRY DETERGENT DISPENSER

(71) Applicant: Butler's Brand, Inc., New York, NY (US)

(72) Inventor: David N. Youdovin, New York, NY (US)

(73) Assignee: Butler's Brand, Inc., New York, NY (US)

( * ) Notice: Subject to any disclaimer, the term of this patent is extended or adjusted under 35 U.S.C. 154(b) by 0 days.

(21) Appl. No.: 17/002,936

(22) Filed: Aug. 26, 2020

(65) Prior Publication Data

US 2021/0063219 A1 Mar. 4, 2021

Related U.S. Application Data

(60) Provisional application No. 62/891,521, filed on Aug. 26, 2019.

(51) Int. Cl.
*B65D 47/08* (2006.01)
*G01F 11/26* (2006.01)
*B65D 85/804* (2006.01)

(52) U.S. Cl.
CPC ........ *G01F 11/262* (2013.01); *B65D 47/0876* (2013.01); *B65D 85/804* (2013.01)

(58) Field of Classification Search
CPC .. G01F 11/262; B65D 47/0876; B65D 85/804
See application file for complete search history.

(56) References Cited

U.S. PATENT DOCUMENTS

| | | | | |
|---|---|---|---|---|
| 9,567,140 | B2* | 2/2017 | Backaert | B65D 25/56 |
| 10,682,658 | B1* | 6/2020 | Youdovin | B05B 11/0054 |
| 10,766,045 | B1* | 9/2020 | Youdovin | B05B 7/265 |
| 2005/0224515 | A1 | 10/2005 | Mon et al. | |
| 2012/0324655 | A1 | 12/2012 | Chawla et al. | |
| 2015/0360831 | A1 | 12/2015 | Backert et al. | |
| 2017/0014843 | A1* | 1/2017 | Richman | B05B 15/30 |

FOREIGN PATENT DOCUMENTS

WO   WO 2011/163457 A1   12/2011

OTHER PUBLICATIONS

International Searching Authority, International Search Report and Written Opinion for International Application No. PCT/US2020/047879, dated Nov. 19, 2020, (8 pages), U.S. Patent and Trademark Office, US.

* cited by examiner

*Primary Examiner* — Frederick C Nicolas
(74) *Attorney, Agent, or Firm* — Alston & Bird LLP (57) ABSTRACT

A dispenser for dispensing a predefined volume of cleaning solution is provided. The dispenser comprises a dispensing section and a base. The dispensing section comprises a dispensing reserve, a measuring component disposed within the dispensing reserve, and a spout fluidly coupled to the measuring component. The measuring component is configured to provide a predefined volume of cleaning solution to be dispensed via the spout during a dispensing action of the dispenser. The base comprises a reservoir portion configured to contain the cleaning solution. When the dispensing section is coupled to the base, the dispensing reserve is in fluid communication with the reservoir portion.

20 Claims, 6 Drawing Sheets

CONCENTRATED LAUNDRY DETERGENT DISPENSER

CROSS-REFERENCE TO RELATED APPLICATIONS

This application claims priority to U.S. Application No. 62/891,521, filed Aug. 26, 2019, the content of which is incorporated herein by reference in its entirety.

TECHNICAL FIELD

Embodiments relate generally to concentrated laundry detergent dispensers.

BACKGROUND

Laundry detergent is generally sold to consumers in a form that is ready for consumers to use directly. In this form, transporting the laundry detergent includes transporting large, heavy, generally single-use containers.

BRIEF SUMMARY OF EXAMPLE EMBODIMENTS

Example embodiments provide a concentrated laundry detergent, appropriate means for transporting the concentrated laundry detergent, and a dispenser for dispensing concentrated laundry detergent and/or a deconcentrated laundry detergent. Various embodiments provide a dispenser configured to dispense a predefined volume of cleaning solution during a dispensing action. In an example embodiment, the dispensing action is at least partially inverting the dispenser such that the cleaning solution may be poured out of a spout of the dispenser. In various embodiments, a dispenser is provided for dispensing cleaning fluid provided via a cleaning pod. In an example embodiment, a cleaning pod is a membrane, film, or other container configured to contain cleaning solution (e.g., concentrated cleaning solution) therein.

According to a first aspect, a dispenser is provided. In an example embodiment, the dispenser comprises a dispensing section and a base. The dispensing section comprises a dispensing reserve, a measuring component disposed within the dispensing reserve, and a spout fluidly coupled to the measuring component. The measuring component is configured to provide a predefined volume of cleaning solution to be dispensed via the spout during a dispensing action of the dispenser. The base comprises a reservoir portion configured to contain the cleaning solution. When the dispensing section is coupled to the base, the dispensing reserve is in fluid communication with the reservoir portion.

In an example embodiment, the cleaning solution is laundry detergent and the predefined volume is an amount of laundry detergent to be used for washing one load of laundry in a washing machine. In an example embodiment, the spout is a no drip spout. In an example embodiment, the dispensing action comprises at least partially inverting the dispenser. In an example embodiment, the dispensing portion comprises a dispensing pipette that fluidly couples the measuring component to the spout.

In an example embodiment, the dispensing section further comprises a pod chamber configured to receive a cleaning pod comprising concentrated cleaning solution therein. In an example embodiment, the pod chamber comprises an opening mechanism configured to at least partially open the cleaning pod to release the concentrated cleaning solution. In an example embodiment, the opening mechanism is configured to cause the concentrated cleaning solution released form the cleaning pod to be provided to the reservoir portion. In an example embodiment, the opening mechanism is a hollow puncture pin coupled to a reservoir pipette configured to provide the concentrated cleaning solution released form the cleaning pod to be provided to the reservoir portion. In an example embodiment, the reservoir portion is configured for mixing the concentrated cleaning solution with a dilution chemical therein so as to generate the cleaning solution. In an example embodiment, the dispensing section comprises a chamber cover that is moveable between an open position and a closed position. In an example embodiment, when the chamber cover is moved to the closed position, the cleaning pod within the pod chamber is caused to engage with the opening mechanism such that the cleaning pod is at least partially opened.

In an example embodiment, the measuring component comprises a measuring opening configured to permit the predefined volume of cleaning solution to enter the measuring component from the dispensing reserve. In an example embodiment, the measuring component comprises a dispensing opening fluidly coupled to a dispensing pipette which is fluidly coupled to the spout. In an example embodiment, the predefined volume is defined by at least one of (a) an internal volume of the measuring component, (b) a position of the measuring opening on a surface of the measuring component, or (c) a location of the measuring opening within the dispensing reserve. In an example, embodiment, the measuring component is a hollow (a) cylinder or (b) prism having a dispensing opening disposed at a first end thereof and the measuring opening is disposed in an elongated surface of the measuring component closer to the first end than a second end of the measuring component disposed opposite the first end.

According to another aspect, a method for dispensing a cleaning solution is provided. In an example embodiment, the method comprises providing a dispenser. The dispenser comprises the dispenser comprises a dispensing section and a base. The dispensing section comprises a dispensing reserve, a measuring component disposed within the dispensing reserve, and a spout fluidly coupled to the measuring component. The measuring component is configured to provide a predefined volume of cleaning solution to be dispensed via the spout during a dispensing action of the dispenser. The dispensing section further comprises a pod chamber configured to receive a cleaning pod comprising a concentrated cleaning solution therein. The base comprises a reservoir portion configured to contain the cleaning solution. When the dispensing section is coupled to the base, the dispensing reserve is in fluid communication with the reservoir portion. The method further comprises placing a cleaning pod in the pod chamber and moving a chamber cover from an open position to a closed position to cause the cleaning pod to release the concentrated cleaning solution and provide the concentrated cleaning solution to the reservoir portion. The method further comprises performing a dispensing action to cause the predefined volume of cleaning solution to be dispensed via the spout.

In an example embodiment, when the dispensing action is performed, cleaning solution from the reservoir portion enters the dispensing reserve, the predefined volume of cleaning solution enters the measuring component via a measuring opening therein, and the predefined volume is provided to the spout via a dispensing opening in the measuring component. In an example embodiment, the dispensing action comprises at least partially inverting the dispenser. In an example embodiment, the cleaning solution is a mixture of the concentrated cleaning solution and a dilution chemical.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

Figure 1:
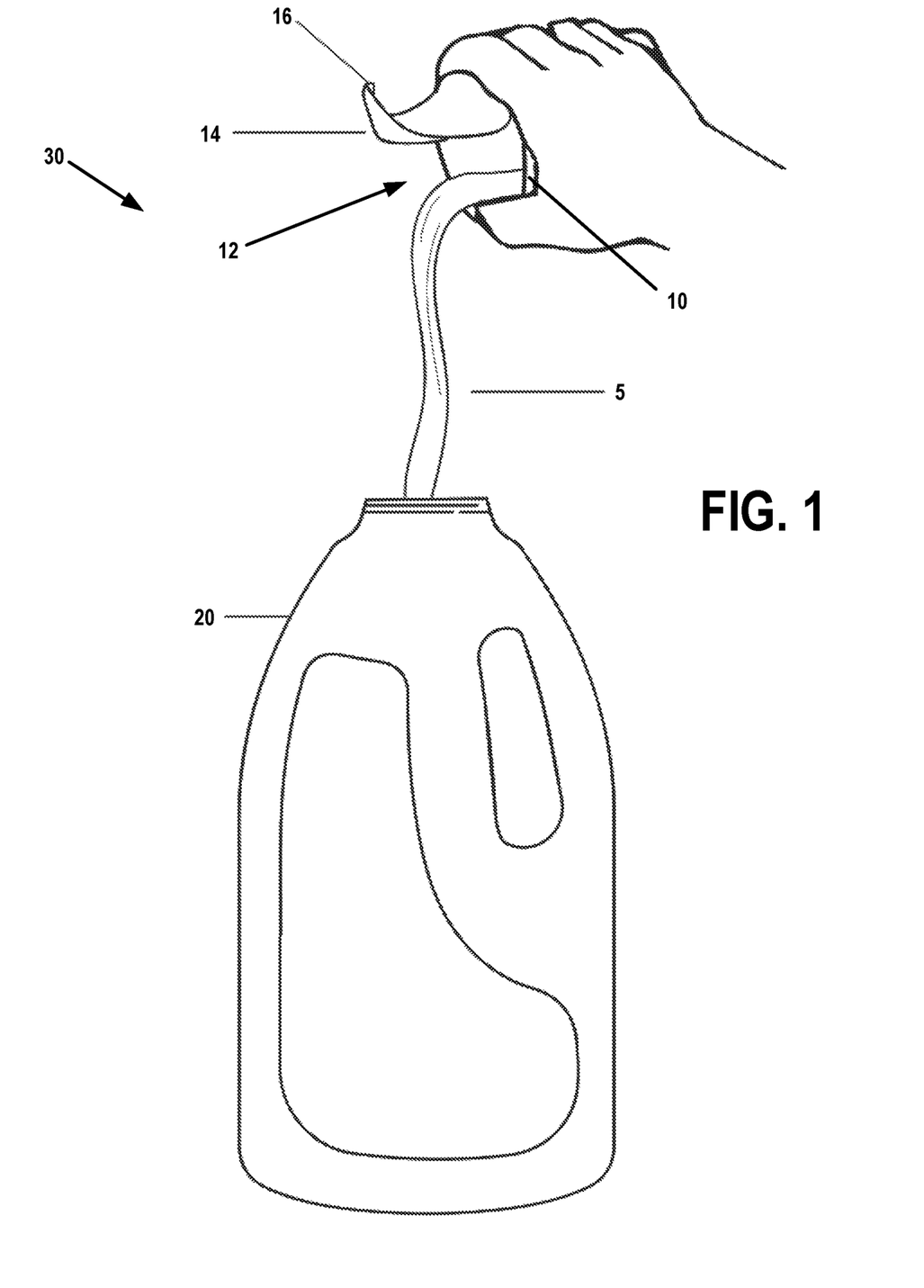
FIG. 1 provides an exploded view of an example embodiment of a concentrated laundry detergent dispenser, in accordance with an example embodiment.
Figure 2:
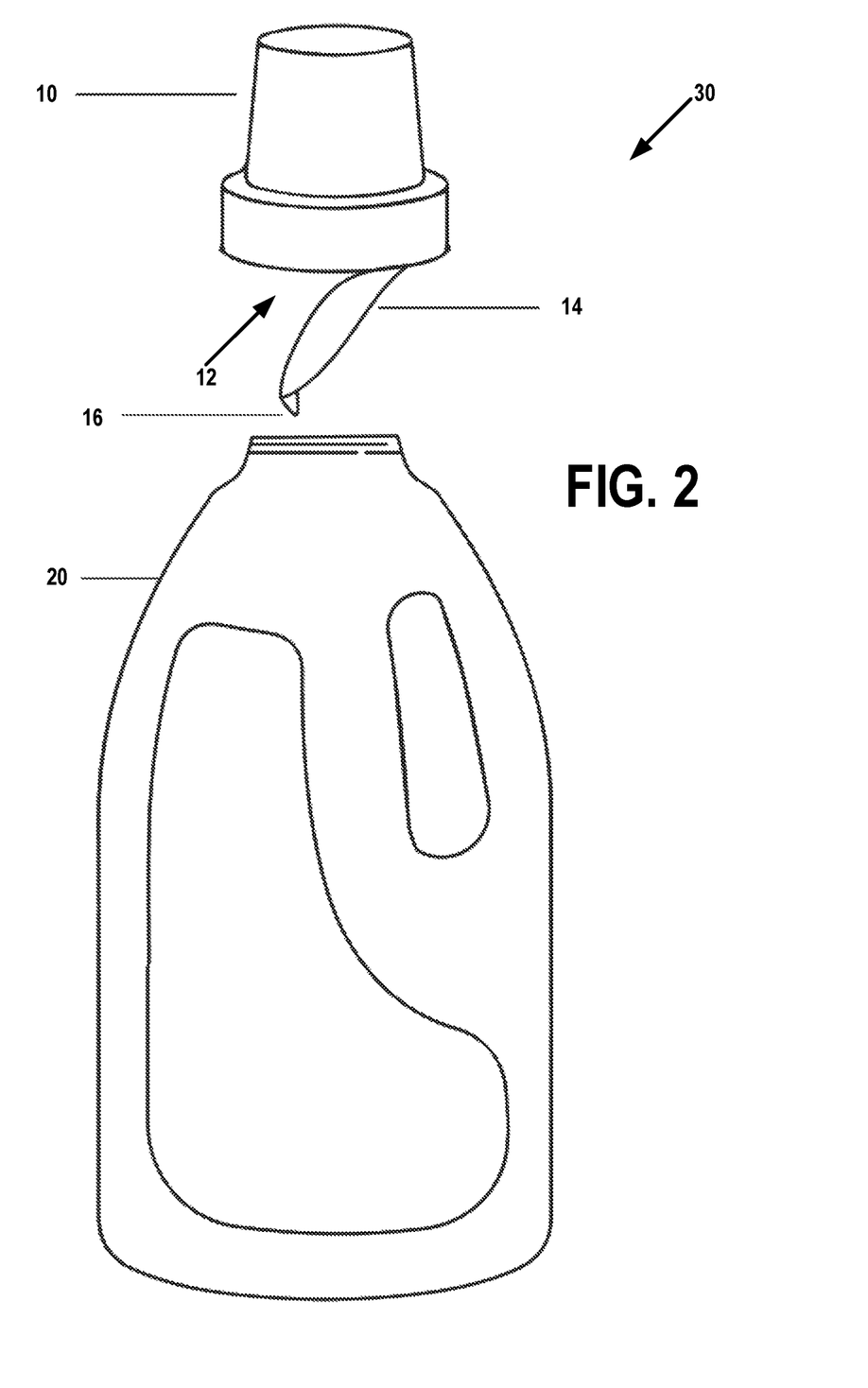
FIG. 2 provides an exploded view of another example embodiment of a concentrated laundry detergent dispenser, in accordance with an example embodiment.

Various embodiments provide a concentrated laundry detergent dispenser 30, example embodiments of which are illustrated in FIGS. 1 and 2. In various embodiments, the laundry detergent dispenser 30 comprises a container 20 and a cap 10. In an example embodiment, the container 20 is configured to receive the concentrated laundry detergent 5 and/or dilution liquid (e.g., water and/or the like), store the concentrated laundry detergent 5 and/or dilution liquid therein (e.g., within a receptacle portion of the container 20), dispense the concentrated laundry detergent 5 and/or dilution liquid therefrom, and/or the like. In various embodiments, the laundry detergent dispenser 30 is made of metal (e.g., aluminum), glass, plastic and/or the like and is designed and/or configured to be a reusable container.

In an example embodiment, a cap 10 is filled with concentrated laundry detergent 5. The concentrated laundry detergent 5 may be stored in a storage cavity 12 of the cap 10, for example. the concentrated laundry detergent 5 may be sealed within the storage cavity 12 via a seal 14. In an example embodiment, the seal 14 is a foil seal. In an example embodiment, the seal 14 comprises a tab 16. In an example embodiment, the cavity 12 of the cap 10 is configured to hold and/or have sealed therein approximately five to six ounces of concentrated laundry detergent 5. In an example embodiment, the cavity 12 of the cap 10 is configured to hold and/or have sealed therein approximately three to ten ounces of concentrated laundry detergent 5. In an example embodiment, the cap 10 may comprise one or more measurement lines for measuring out deconcentrated laundry detergent for use in standard washing machines, high efficiency washing machines, front loading washing machines, top loading washing machines, and/or the like. In an example embodiment, the one or more measurement lines may correspond to the amount of deconcentrated laundry detergent for use in washing different size loads (small, medium, large, extra-large and/or the like) and/or loads of different soil levels (e.g., lightly soiled, medium soiled, heavy soiled, and/or the like).

In various embodiments, a consumer may purchase, receive, and/or acquire a cap 10 having concentrated laundry detergent 5 sealed therein (e.g., within the storage cavity 12 via a seal 14). The consumer may already have a container 20 and/or may purchase, receive, and/or acquire a container 20. In an example embodiment, the consumer may fill the container 20 with a particular amount of dilution liquid and/or to a fill line marked on the container 20. In an example embodiment, the dilution liquid may be added to the container such that a deconcentrated laundry detergent is formed by mixing approximately four parts dilution liquid to one part concentrated laundry detergent 5. In various embodiments, the deconcentrated laundry detergent is formed by mixing approximately three to six parts dilution liquid to one part concentrated laundry detergent 5. In an example embodiment, the concentrated laundry detergent is concentrated to a level of less than half an ounce per nominal laundry load. In an example embodiment, the concentrated laundry detergent is concentrated to a level of approximately 0.25 ounces or less per nominal laundry load. For example, in an example embodiment, five ounces of concentrated laundry detergent 5 may be used to make approximately twenty laundry loads of deconcentrated laundry detergent.

In an example embodiment, the container 20 may comprise a puncture element configured to puncture the seal 14 of a cap 10 secured to the container 20. For example, the container 20 may include a puncture element that causes at least a portion of the seal 14 of the cap 10 to be punctured, to rupture, and/or the like when the cap 10 is threaded (e.g., twisted and/or screwed) onto the container 20. For example, the container 20 may comprise threadings and/or other mating mechanism(s) and the cap 10 may comprise complimentary threadings and/or other complimentary mating mechanism(s). When the cap 10 is secured and/or attached to the container via the engagement of the threadings and/or other mating mechanism(s) of the container 20 with the corresponding complimentary threadings and/or other complimentary mating mechanism(s) of the cap 10, the puncture element may puncture and/or rupture the seal 14. The concentrated laundry detergent 5 may then pass from the storage cavity 12 of the cap 10 into the receptacle portion of the container 20. For example, the container 20 may comprise a spigot or peg that engages the seal 14 when the cap is secured and/or attached to the container 20 so as to release the concentrated laundry detergent 5 from the storage cavity 12. In an example embodiment, a consumer may use the tab 16 to puncture, rupture, and/or remove the seal 14 and the consumer may pour the concentrated laundry detergent 5 into the receptacle portion of the container 20.

As should be understood, the container 20 may be reused and the consumer may locally source the dilution liquid (e.g., water). The transportation of the concentrated laundry detergent 5 filled caps 10 is significantly less costly (e.g., in terms of carbon footprint and financial cost) per nominal load of laundry. Additionally, the reusability of the container 20 greatly reduces the amount of packaging discarded by the consumer per nominal load of laundry. thus, various embodiments provide a laundry detergent dispenser 30 that has less of an environmental impact than traditional laundry detergent dispensers.

While the above description describes the use of the dispenser 30 with respect to laundry detergent, it should be understood that the dispenser 30 may be utilized with a variety of cleaning products without departing from the scope of the present invention. For example, the cap 10 may store one of a variety of concentrated cleaning products such that by combining dilution liquid and the concentrated cleaning product within the container, a deconcentrated clean product may be formed and may be dispensed from the container 20, possibly using the cap 10 as a measuring device to control the dispensation thereof.

Figure 3:
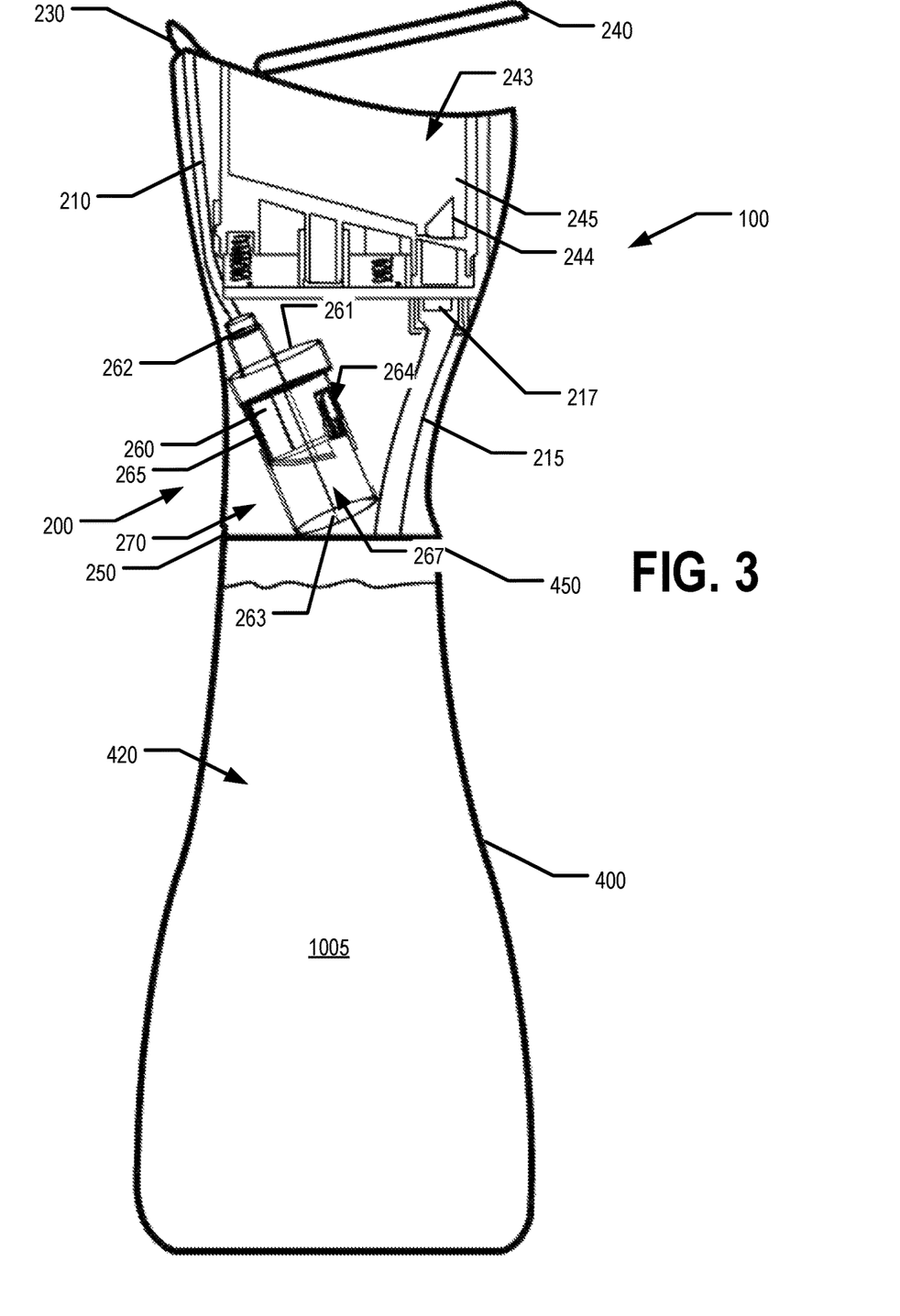
FIGS. 3, 4, and 5 provide cross-section views of another example embodiment of a concentrated laundry detergent dispenser, in accordance with an example embodiment.
Figure 4:
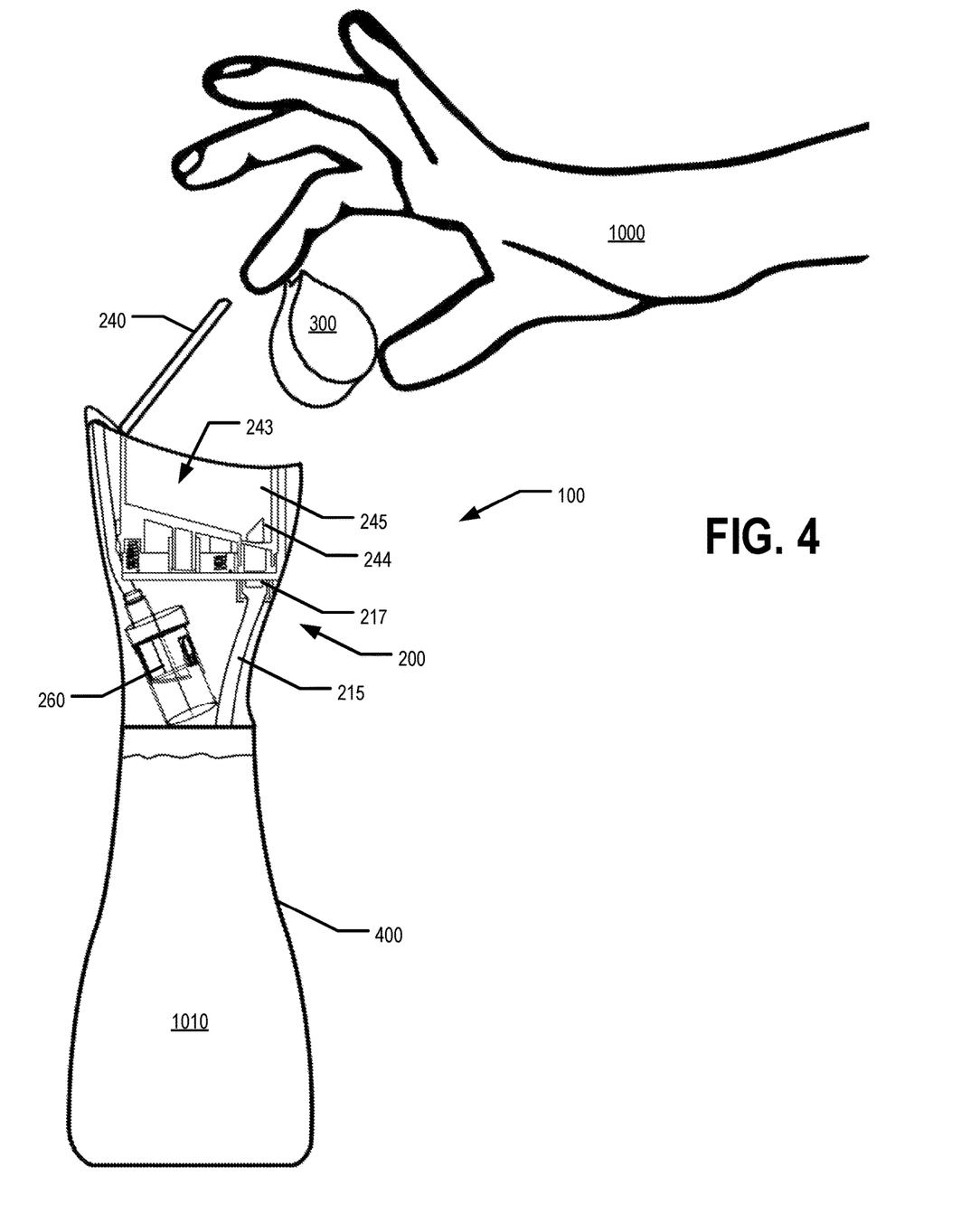
Figure 5:
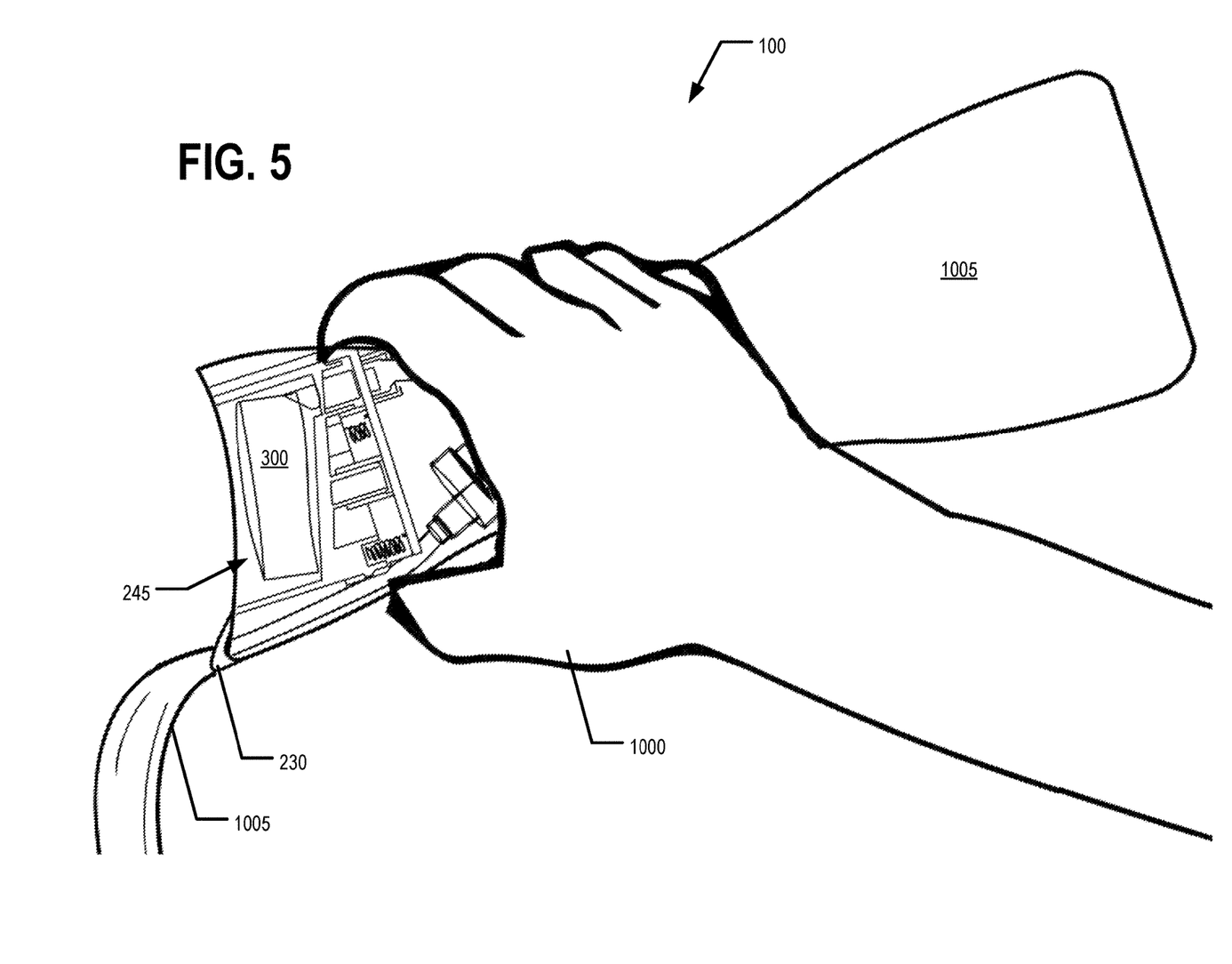

FIGS. 3, 4, and 5 illustrate cross sections of another example concentrated laundry detergent dispenser 100. In various embodiments, the dispenser 100 is configured for dispensing a predetermined volume of diluted and/or deconcentrated cleaning solution. In various embodiments, the predetermined volume of diluted and/or deconcentrated cleaning solution is an appropriate volume for washing a load of laundry in a washing machine, a load of dishes in a dishwasher, and/or the like, as appropriate for the application. In various embodiments, the dispenser 100 comprises a dispensing section 200 and a base 400. FIG. 3 illustrates the dispenser 100 with the chamber cover 240 in an open position. FIG. 4 illustrates the dispenser 100 with the chamber cover 240 in the open position and a cleaning pod 300 being inserted into the pod chamber 245 by a user's hand 1000. FIG. 5 illustrates the dispenser 100 with the chamber cover 240 in a closed position and the dispenser 100 is being at least partially inverted by a user's hand 1000 to cause cleaning solution 1005 to be dispensed from the dispenser 100 via the spout 230.

In example embodiments, the dispensing section 200 comprises a reservoir pipette 215, a dispensing pipette 210, a spout 230, attachment portion 250, a pod chamber 245, and a chamber cover 240. In an example embodiment, the chamber cover acts to enclose a pod 300 comprising concentrated cleaning solution within the pod chamber 245. In an example embodiment, the spout 230 is a non-drip spout. For example, the spout 230 may be configured to not drip when the cleaning solution 1005 is not actively being poured therefrom. For example, the spout 230 may be shaped and/or angled such that, when the dispenser 100 is not at least partially inverted, cleaning solution does not drip from the spout 230. The attachment portion 250 is configured to secure the dispensing section 200 to the base 400 (e.g., via threadings and/or another mating mechanism). In example embodiments, various portions of the dispensing section 200 may comprise aluminum, another metal, and/or other appropriate resilient material.

The dispensing pipette 210 is configured to, when the dispenser 100 is at least partially inverted, receive cleaning solution 1005 via a measuring component 260 and provide the cleaning solution to the spout 230. In various embodiments, the measuring component 260 is a hollow three dimensional object such as a hollow cylinder or prism. For example, the measuring component 260 may comprise a first end 261, a second end 263 disposed opposite the first end, and an elongated surface 265 or set of elongated surfaces 265 connecting the first end 261 and the second end 263. The first end 261, second end 263, and elongated surface(s) 265 may define an internal volume 267 of the measuring component 260. A dispensing opening 262 may be disposed at the first end 261 of the measuring component 260. In various embodiments, the dispensing opening 262 is coupled to a dispensing pipette 210. A measuring opening 264 is disposed in the elongated surface 265. In an example embodiment, a centroid and/or center point of the measuring opening 264 is disposed closer to the first end 261 than the second end 263. In various embodiments, the predefined volume is defined by (a) the internal volume 267 of the measuring component 260, (b) the position of the measuring opening 264 on the elongated surface 265 of the measuring component 260, (c) a location of the measuring opening 264 within the dispensing reserve 270, or (d) a combination of the internal volume 267, the position of the measuring opening on the elongated surface 265, and/or the location of the measuring opening 264 within the dispensing reserve 270.

In an example embodiment, the cleaning solution enters the measuring component 260 via a measuring opening 264 of the measuring component 260. For example, when the dispenser 100 is at least partially inverted (e.g., rotated such that the dispensing section 200 is at least partially below at least a portion of the base 400) cleaning solution 1005 fills the dispensing reserve 270. In various embodiments, the dispensing reserve 270 is an open region of the dispensing section 200 that is fluidly coupled to the reservoir portion 420. When the dispenser 100 is at least partially inverted, the dispensing reserve 270 is configured to act as a fluid reserve or basin from which cleaning solution may flow into the measuring component 260. A predefined volume of the cleaning solution 1005 in the dispensing reserve 270 is able to flow into the measuring component 260 via the measuring opening 264. The predetermined volume of cleaning solution may then flow from the measuring component 260 into the dispensing pipette 210 via the dispensing opening 262. In an example embodiment, the volume of the measuring component 260, the placement of the measuring opening 264 on the measuring component 260, and the placement of the measuring component 260 (and the measuring opening 264) within the dispensing reserve 270 causes only a predefined volume of cleaning solution to be able to flow into measuring component 260 (e.g., via the measuring opening 264) during each at least partial inversion of the dispenser 100. For example, a volume of air within the measuring component 260 at the time of the at least partial inversion of the dispenser 100 and the placement of the measuring opening on 264 the measuring component 260 may limit the volume of cleaning solution that can flow from the dispensing reservoir 270 into the measuring component 260 and ultimately be dispensed (e.g., via the dispensing opening 262 to the dispensing pipette 210, and out the spout 230). For example, the volume of air that flows out of the measuring component 260 and into the dispensing reservoir 270 may be approximately equal to the predefined volume of cleaning solution dispensed from the dispenser 100 during a single at least partial inversion of the dispenser 100.

The attachment portion 250 of the dispensing section 200 is configured to secure the dispensing section 200 to the base 400. The attachment portion 250 may comprise threads or another mating mechanism for securing the handle 200 to the base 400. For example, the attachment portion 450 of the base may comprise corresponding threads such that the base 400 may be screwed onto the dispensing section 200.

In various embodiments, the dispensing section 200 further comprises a capsule chamber 245. The capsule chamber 245 portion of the dispensing section 200 is configured to receive the cleaning pod 300 and comprises one or more elements configured to puncture the cleaning pod 300 to release the concentrated cleaning solution contained within the cleaning pod 300. In an example embodiment, a cleaning pod 300 is configured to hold concentrated cleaning solution therein. In an example embodiment, the cleaning pod 300 is made of aluminum, another metal, plastic, cardboard, paperboard, a natural post-consumer recycled material, or another appropriate material and/or combination thereof. For example, the cleaning pod 300 may be a capsule, container, and/or the like configured to contain concentrated cleaning solution. For example, the cleaning pod 300 may be punctured within the capsule chamber 245 to provide concentrated cleaning solution to the reservoir portion 420. In various embodiments, the cleaning pod 300 may have various shapes. For example, the cleaning pod 300 may be a membrane, film, and/or the like configured to seal the concentrated cleaning solution contained therein. For example, the cleaning pod 300 may be spherical, ellipsoidal, and/or the like.

In example embodiments, the pod chamber 245 is configured to receive a cleaning pod 300 therein. The pod chamber 245 may further comprise a receiving portion 243 configured to receive the cleaning pod 300 therein. The pod chamber 245 may further comprise an opening mechanism for at least partially opening the cleaning pod 300. In an example embodiment, the opening mechanism is a puncture pin 244. For example, the capsule chamber 245 may comprise a puncture pin 244 configured to at least partially open (e.g., puncture) a surface and/or membrane/film of the cleaning pod 300 when the chamber cover 240 is moved from an open position to a closed position on the dispensing section 200. When the chamber cover 240 is in the closed position, the chamber cover 240 may exert pressure on the cleaning pod 300 pushing the cleaning pod 300 against the puncture pin 244 such that the puncture pin 244 at least partially opens (e.g., punctures) the cleaning pod 300. For example, the cleaning pod 300 and the pod chamber 245 may be sized and/or shaped such that when the pod chamber 245 is closed by moving the chamber cover 240 into the closed position with a cleaning pod 300 disposed in the receiving portion 243, the cleaning pod 300 is pressed against the puncture pin 244 with sufficient force/pressure that the puncture pin 244 at least partially opens the cleaning pod 300. When the chamber cover 240 is in the closed position, the chamber cover is in a position such that the chamber cover 240 at least partially covers the receiving portion 243 such that the receiving portion 243 is not accessible (e.g., a cleaning pod 300 may not be inserted into and/or removed from the receiving portion 243). For example, the chamber cover 240 may be configured such that moving the chamber cover from the open position to the closed position encloses and/or at least partially seals the receiving portion 243 of the pod chamber 245. In various embodiments, moving chamber cover lever 240 from the closed position to the open position causes the chamber cover 240 to move into a position where the receiving portion 243 is accessible (e.g., not closed or sealed such that a cleaning pod 300 may be inserted into and/or removed from the receiving portion 243).

In various embodiments, the puncture pin 244 is be disposed in the receiving portion 243. In an example embodiment, the moving of the chamber cover 240 from the open position to the closed position causes the chamber cover 240 to press against the cleaning pod 300 disposed within the receiving portion 243, causing the cleaning pod 300 to be pressed against the puncture pin 244 within the receiving portion 243 such that the puncture pin 244 punctures the cleaning pod 300. In an example embodiment, the puncture pin 244 is coupled to the reservoir pipette 215 such that cleaning solution may vacate the cleaning pod 300 via the puncture in the cleaning pod caused by engagement of the puncture pin 244 with the cleaning pod 30 and enter the reservoir pipette 215. For example, the puncture pin 244 may be a hollow puncture pin affixed to a mouth 217 of the reservoir pipette 215. The reservoir pipette 215 facilitates the flow of concentrated cleaning solution from the cleaning pod 300 to the reservoir portion 420 of the base 400 for dilution and mixture.

In example embodiments, the dispenser 100 comprises a base 400. The base 400 may comprise a reservoir portion 420, and an attachment portion 450. In example embodiments, the attachment portion 450 is configured to secure the base 400 to the dispensing section 200. The reservoir portion 420 is configured to receive dilution chemical and concentrated cleaning solution therein, store cleaning solution formed by mixing dilution chemical and concentrated cleaning solution therein, and provide the cleaning solution to the dispensing reservoir 270 when the dispenser is at least partially inverted. In example embodiments, the base 400 may comprise aluminum, another metal, or other appropriate material such as glass, plastic, wood, rubber, and/or the like.

In example embodiments, the reservoir portion 420 may comprise a hollow portion within the base 400 configured for receiving (concentrated) cleaning solution therein from the cleaning pod 300 (e.g., via the reservoir pipette 215) and storing cleaning solution therein. For example, the cleaning pod 300 may provide concentrated cleaning solution to the reservoir portion 420 via the reservoir pipette 215. The reservoir portion 420 may contain the cleaning solution therein. In example embodiments, the reservoir portion 420 may be configured to receive and/or contain a dilution chemical (e.g., water) therein for mixing with concentrated cleaning solution provided by the cleaning pod 300. In example embodiments, the reservoir portion 420 may be configured to have a dilution chemical (e.g., water) and concentrated cleaning solution mixed therein to provide a diluted concentrated cleaning solution.

In example embodiments, the attachment portion 450 of the base 400 comprises a mechanism for securing the base 400 to the dispensing section 200. For example, the attachment portion 450 of the base 400 may comprise threads that correspond to threads on the attachment portion 250 of the dispensing section 200 and/or another mating mechanism that corresponds to (e.g., is configured to mate with) the mating mechanism of the attachment portion 250 of the dispensing section 200. In an example embodiment, the attachment portion 450 of the base 400 is adhered to the attachment portion of the dispensing section 200. For example, the attachment portion 450 of the base 400 is permanently secured to the attachment portion of the dispensing section 200. For example, the base 400 and the dispensing section 200 may be at least partially integrally formed, in an example embodiment.

Figure 6:
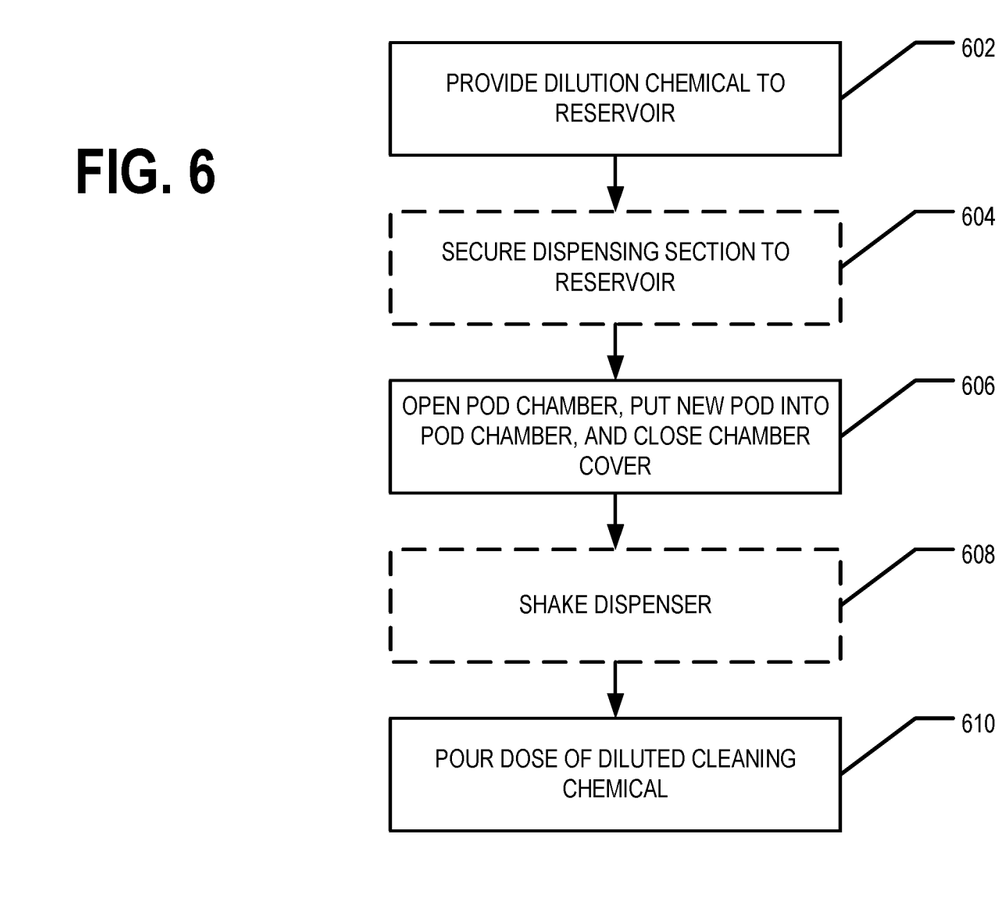
FIG. 6 provides a flowchart of processes, operations, procedures, and/or the like for dispensing diluted concentrated cleaning solution from a concentrated laundry detergent dispenser, in accordance with example embodiments.

FIG. 6 provides a flowchart illustrating use of the dispenser 100 to dispense cleaning solution (e.g., a laundry detergent for washing a load of laundry in a washing machine), according to an example embodiment. Starting at step 602, a dilution chemical 1010 is provided to a reservoir portion 420 of the dispenser 100. For example, a user may fill the reservoir portion 420 with dilution chemical up to a fill line and/or the like. In an example embodiment, the dilution chemical may be deionized water, distilled water, tap water, filtered water, and/or the like. In an example embodiment, the dilution chemical is provided to the reservoir portion 420 via the pod chamber 245. For example, the dilution chemical may be provided via the opening in the puncture pin 244 via the reservoir pipette 215.

At step 604, the dispensing section 200 is secured to the base 400. For example, the threadings and/or other mating mechanism of the attachment portion 250 of the dispensing section 200 may be mated and/or engaged with the threadings and/or other mating mechanism of the attachment 450 of the base 400 such that the dispensing section 200 is secured to the base 400.

At step 606, the chamber cover 240 is moved to the open position. If a spent pod 300 is disposed within the receiving portion 243 of the pod chamber 245, the spent pod 300 is removed. A new cleaning pod 300 is placed in the receiving portion 243 of the pod chamber 245, as shown in FIG. 4. The chamber cover 240 may then be moved to the closed position thereby securing the new cleaning pod 300 within the pod chamber 245, causing the puncture pin 244 to at least partially open (e.g., puncture) the cleaning pod 300, and causing the concentrated cleaning solution within the cleaning pod 300 to be released into the reservoir portion 420 via the reservoir pipette 215.

At step 608, the dispenser 100 may be optionally shaken. For example, the user may shake the dispenser to cause the dilution chemical and the concentrated cleaning solution to mix to provide cleaning solution 1005.

At step 610, the user may pour a dose of cleaning solution 1005 from the dispenser 100 via a dispensing action. For example, the dispensing action may be at least partially inverting the dispenser 100. For example, the user may hold the dispenser 100 about the attachment portions 250, 450, as shown in FIG. 5, and at least partially invert the dispenser 100 to cause cleaning solution to be dispensed from (e.g., pour out of) the spout 230. For example, the dispenser 100 may be rotated such that the spout 230 of the dispensing section 200 is at least partially below at least a portion of the base 400. For example, when the dispenser 100 is at least partially inverted, cleaning solution 1005 flows into the dispensing reserve 270. The configuration of the measuring component 260 permits a predefined volume of cleaning solution to flow into the measuring component 260 via the measuring opening 264 and through the dispensing opening 262 to the dispensing pipette 210 and out through the spout 230. Thus, a predefined volume of cleaning solution is dispensed from the dispenser 100 via the spout 230.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A dispenser comprising:
    a dispensing system comprising:
        a measuring component,
        a spout, and
        a dispensing pipette that fluidly couples the measuring component to the spout,
        wherein the measuring component is configured to provide a predefined volume of cleaning solution to be dispensed via the spout during a dispensing action of the dispenser; and
    a base comprising a reservoir portion configured to contain the cleaning solution, wherein the dispensing system is coupled to the base such that the measuring component is in fluid communication with the reservoir portion.

2. The dispenser of claim 1, wherein the cleaning solution is laundry detergent and the predefined volume is an amount of laundry detergent to be used for washing one load of laundry in a washing machine.

3. The dispenser of claim 1, wherein the spout is a no drip spout.

4. The dispenser of claim 1, wherein the dispensing action comprises at least partially inverting the dispenser.

5. The dispenser of claim 1, wherein the dispensing system further comprises a pod chamber configured to receive a cleaning pod comprising concentrated cleaning solution therein.

6. The dispenser of claim 5, wherein the pod chamber comprises an opening mechanism configured to at least partially open the cleaning pod to release the concentrated cleaning solution.

7. The dispenser of claim 6, wherein the opening mechanism is configured to cause the concentrated cleaning solution released form the cleaning pod to be provided to the reservoir portion.

8. The dispenser of claim 7, wherein the opening mechanism is a hollow puncture pin coupled to a reservoir pipette configured to provide the concentrated cleaning solution released form the cleaning pod to be provided to the reservoir portion.

9. The dispenser of claim 7, wherein the reservoir portion is configured for mixing the concentrated cleaning solution with a dilution chemical therein so as to generate the cleaning solution.

10. The dispenser of claim 6, wherein the dispensing system comprises a chamber cover that is moveable between an open position and a closed position.

11. The dispenser of claim 10, wherein when the chamber cover is moved to the closed position, the cleaning pod within the pod chamber is caused to engage with the opening mechanism such that the cleaning pod is at least partially opened.

12. The dispenser of claim 1, wherein the measuring component comprises a measuring opening configured to permit the predefined volume of cleaning solution to enter the measuring component from the reservoir portion.

13. The dispenser of claim 12, wherein the measuring component comprises a dispensing opening fluidly coupled to the dispensing pipette which is fluidly coupled to the spout.

14. The dispenser of claim 12, wherein the predefined volume is defined by at least one of (a) an internal volume of the measuring component, or (b) a position of the measuring opening on a surface of the measuring component.

15. The dispenser of claim 1, wherein the measuring component is a hollow (a) cylinder or (b) prism having a dispensing opening disposed at a first end thereof and the measuring opening is disposed in an elongated surface of the measuring component closer to the first end than a second end opposite the first end.

16. A method for dispensing a predefined volume of a cleaning solution, the method comprising:
    providing a dispenser, the dispenser comprising:
        a dispensing system comprising:
            a measuring component, a spout fluidly coupled to the measuring component, and a pod chamber configured to receive a cleaning pod comprising a concentrated cleaning solution therein;

wherein the measuring component is configured to provide a predefined volume of cleaning solution to be dispensed via the spout during a dispensing action of the dispenser; and a base comprising a reservoir portion configured to contain the cleaning solution, wherein the dispensing system is coupled to the base such that the measuring component is in fluid communication with the reservoir portion;

placing the cleaning pod in the pod chamber and moving a chamber cover from an open position to a closed position to cause the cleaning pod to release the concentrated cleaning solution and provide the concentrated cleaning solution to the reservoir portion;

performing a dispensing action to cause the predefined volume of cleaning solution to be dispensed via the spout.

17. The method of claim 16, wherein, when the dispensing action is performed, the predefined volume of cleaning solution enters the the measuring component via a measuring opening therein, and the predefined volume is provided to the spout via a dispensing opening in the measuring component.

18. The method of claim 16, wherein the dispensing action comprises at least partially inverting the dispenser.

19. The method of claim 16, wherein the cleaning solution is a mixture of the concentrated cleaning solution and a dilution chemical.

20. A dispenser comprising:
a dispensing system comprising:
a measuring component,
a spout fluidly coupled to the measuring component, and
a pod chamber configured to receive a cleaning pod comprising concentrated cleaning solution therein,
wherein the measuring component is configured to provide a predefined volume of cleaning solution to be dispensed via the spout during a dispensing action of the dispenser, and
wherein the pod chamber comprises an opening mechanism configured to at least partially open the cleaning pod to release the concentrated cleaning solution; and
the dispenser further comprises a base comprising a reservoir portion configured to contain the cleaning solution, wherein the dispensing system is coupled to the base such that the measuring component is in fluid communication with the reservoir portion.

* * * * *

UNITED STATES PATENT AND TRADEMARK OFFICE
CERTIFICATE OF CORRECTION

| | |
|---|---|
| PATENT NO. | : 11,359,952 B2 |
| APPLICATION NO. | : 17/002936 |
| DATED | : June 14, 2022 |
| INVENTOR(S) | : David N. Youdovin |

It is certified that error appears in the above-identified patent and that said Letters Patent is hereby corrected as shown below:

In the Claims

Claim 17, Column 11, Line 24, "enters the the measuring component" should read --enters the measuring component--

Signed and Sealed this
Twenty-fifth Day of April, 2023

Katherine Kelly Vidal
*Director of the United States Patent and Trademark Office*